(12) United States Patent
Burgermeister

(10) Patent No.: US 12,170,490 B2
(45) Date of Patent: Dec. 17, 2024

(54) FREQUENCY CONVERTER

(71) Applicant: Lenze Swiss AG, Romanshorn (CH)

(72) Inventor: Andreas Burgermeister, Mauren (CH)

(73) Assignee: Lenze Swiss AG, Romanshorn (CH)

( * ) Notice: Subject to any disclaimer, the term of this patent is extended or adjusted under 35 U.S.C. 154(b) by 223 days.

(21) Appl. No.: 17/896,180

(22) Filed: Aug. 26, 2022

(65) Prior Publication Data

US 2023/0066034 A1 Mar. 2, 2023

(30) Foreign Application Priority Data

Aug. 27, 2021 (DE) ...................... 10 2021 209 432.5

(51) Int. Cl.
*H02M 5/458* (2006.01)
*H02M 1/08* (2006.01)
*H02M 1/32* (2007.01)

(52) U.S. Cl.
CPC ............ *H02M 5/4585* (2013.01); *H02M 1/08* (2013.01); *H02M 1/32* (2013.01)

(58) Field of Classification Search
CPC ........ H02M 5/4585; H02M 1/08; H02M 1/32; H02H 7/12
See application file for complete search history.

(56) References Cited

U.S. PATENT DOCUMENTS

| | | | |
|---|---|---|---|
| 2003/0072117 A1* | 4/2003 | Maekawa | H05K 9/002 361/86 |
| 2013/0279214 A1 | 10/2013 | Takase et al. | |
| 2018/0226901 A1* | 8/2018 | Sasaki | H02M 1/08 |
| 2020/0321901 A1* | 10/2020 | Araki | H02M 1/088 |
| 2023/0060651 A1* | 3/2023 | Burgermeister | H02M 5/4585 |
| 2023/0318475 A1* | 10/2023 | Burgermeister | G01R 15/06 363/163 |

FOREIGN PATENT DOCUMENTS

DE 10 2009 049 934 A1 4/2011

\* cited by examiner

*Primary Examiner* — Kyle J Moody
(74) *Attorney, Agent, or Firm* — Crowell & Moring LLP

(57) ABSTRACT

A frequency converter includes a monitoring unit that has respective first drive signals of gate drivers of a bidirectional power converter applied to it and that is designed to detect the failure of at least one mains phase of a three-phase AC grid voltage that is supplied to the bidirectional power converter based on a temporal profile of the respective first drive signals.

7 Claims, 2 Drawing Sheets

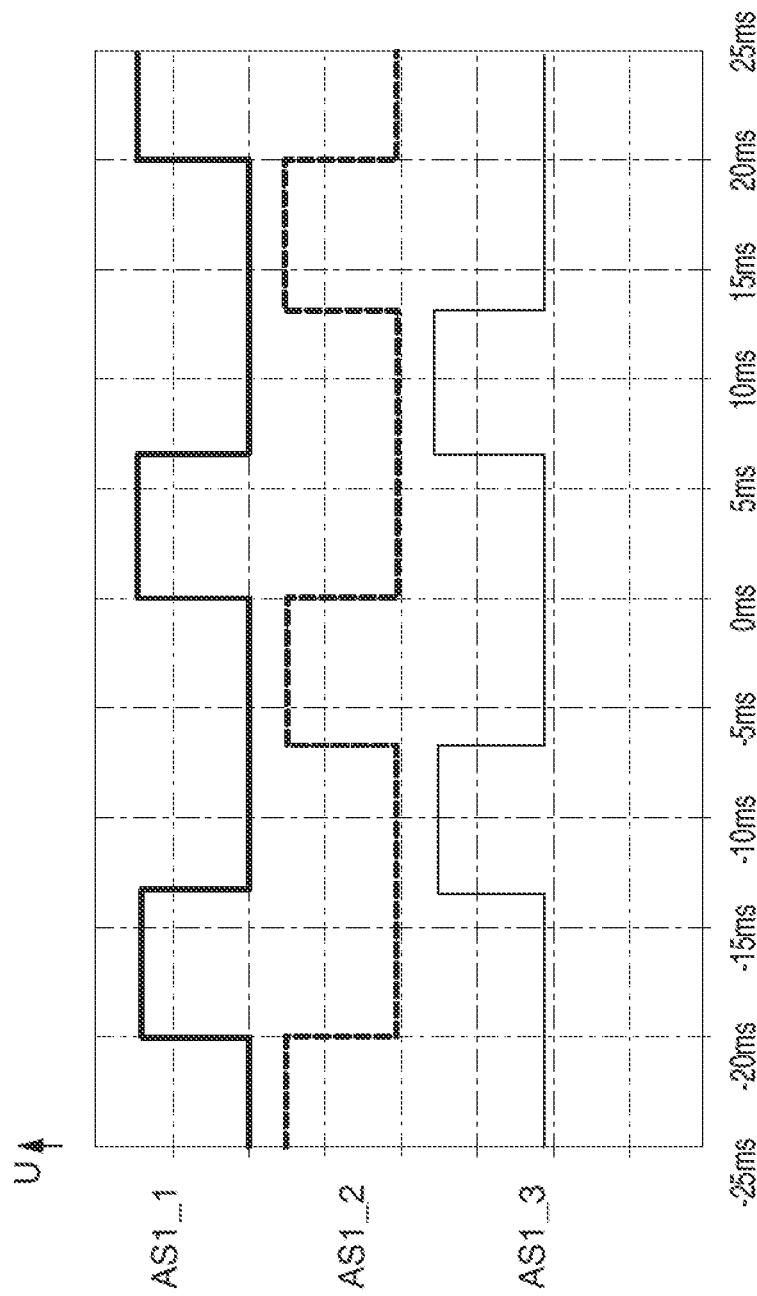

FREQUENCY CONVERTER

CROSS REFERENCE TO RELATED APPLICATION

This application claims priority under 35 U.S.C. § 119 from German Patent Application No. 10 2021 209432.5, filed Aug. 27, 2021, the entire disclosure of which is herein expressly incorporated by reference.

BACKGROUND AND SUMMARY OF THE INVENTION

The invention is based on the object of providing a frequency converter that is able to identify, easily and as reliably as possible, a failure of one or more mains phases of a three-phase AC grid voltage that is used to feed the frequency converter.

The frequency converter conventionally has a first phase connection for the connection of a first phase of a three-phase AC grid voltage, a second phase connection for the connection of a second phase of the three-phase AC grid voltage and a third phase connection for the connection of a third phase of the three-phase AC grid voltage. Reference should also be made in this respect to the relevant technical literature.

The frequency converter furthermore has a conventional three-phase bidirectional power converter that is electrically connected to the first phase connection, the second phase connection and the third phase connection and that is designed to generate a DC voltage from the three-phase AC grid voltage. Reference should also be made in this respect to the relevant technical literature.

The bidirectional power converter has three bridge branches, in particular in a B6 topology.

A respective one of the three bridge branches conventionally has a first semiconductor switching device, for example in the form of an insulated-gate bipolar transistor (IGBT), having a control input and a second semiconductor switching device having a control input, for example likewise in the form of an IGBT. The first semiconductor switching device and the second semiconductor switching device are connected in series between a first electrical conductor, which carries a positive intermediate circuit potential, and a second electrical conductor, which carries a negative intermediate circuit potential. A connection node of the first semiconductor switching device and of the second semiconductor switching device is electrically connected to an associated phase connection. Reference should also be made in this respect to the relevant technical literature.

A respective one of the three bridge branches furthermore has a conventional gate driver that is designed to generate a first drive signal and a second drive signal based on a potential of the associated phase connection or based on a potential difference or a voltage between the phase connections. The control input of the first semiconductor switching device has the first drive signal applied to it and the control input of the second semiconductor switching device has the second drive signal applied to it. The first and second drive signals in this case typically have a rectangular profile with a frequency that corresponds to the AC grid voltage.

The frequency converter furthermore has a monitoring unit that is designed to detect a failure of at least one mains phase of the three-phase AC grid voltage. A failure of a mains phase is present for example when the mains phase no longer carries a sinusoidally changing potential.

According to the invention, the monitoring unit has the respective first drive signals and/or the respective second drive signals of the gate driver applied to it and is designed to detect the failure of the at least one mains phase of the three-phase AC grid voltage based on a temporal profile of the respective first drive signals and/or second drive signals.

In one embodiment, the monitoring unit is designed to detect the failure of the at least one mains phase of the three-phase AC grid voltage based on a pulse duration of the respective first drive signals and/or based on a time difference between pulses of the respective first drive signals.

In one embodiment, the monitoring unit is designed to detect the failure of the at least one mains phase of the three-phase AC grid voltage when the pulse duration of the respective first drive signals and/or the time difference between the pulses of the respective first drive signals exceeds a predefined threshold value.

In one embodiment, the threshold value is predefined on the basis of a frequency of the three-phase AC grid voltage.

In one embodiment, the bidirectional power converter is self-commutated.

In one embodiment, the bidirectional power converter is a line-commutated rectifier.

In one embodiment, the bidirectional power converter is part of a fundamental frequency front-end (F3E). The power converter is in this case typically an active, mains-fed rectifier and an intermediate circuit capacitor has a comparatively low capacitance. Reference should also be made to the relevant technical literature with respect to the F3E standard.

The invention makes it possible to protect the semiconductor switching devices of the bidirectional power converter from being destroyed when using F3E feedback technology by monitoring the mains phase AC frequency, in particular when protection mechanisms fail during feedback mode and island networks then arise. As a result of the absent 50 Hz system, DC voltage is then suddenly present at the mains phases, which leads to bootstrap capacitors of the upper gate driver elements draining slowly and being overloaded by the analogous operation of the semiconductor switching devices.

The mains phases are monitored by monitoring the drive signals generated by way of the gate drivers. Since the gate drivers, in a mains-fed manner, generate their drive signals in the form of square-wave signals with a frequency that corresponds to the frequency of the AC grid voltage, monitoring the frequency of the drive signals makes it possible to check whether the AC grid voltage or its phases has/have a correct temporal profile. As long as the first or lower gate driver elements switch over regularly (50 Hz), the second or upper gate driver elements also switch without any problems due to the common driving.

The monitoring unit observes for example whether the respective switch-on time of all three first drive signals lies within a predefined time window. In the fault-free case, the first drive signals are typically square-wave signals with a frequency of 50 Hz at a grid frequency of 50 Hz. The duration of a pulse may for example be 5 ms to 10 ms at a grid frequency of 50 Hz. If the pulse duration is then significantly greater than for example 5 ms to 10 ms and/or the duration between successive pulses is considerably greater than 20 ms, the monitoring unit may detect the failure of at least one mains phase of the three-phase AC grid voltage, in response to which the gate drivers are driven such that they no longer generate any drive signals.

The pulse duration or the frequency of the pulses of the drive signals may for example be monitored by way of a simple low-pass filter, for example in the form of an RC filter. The time constants of the RC filters are for example designed such that, below a frequency of the AC grid voltage of 30 Hz, the failure of the at least one mains phase of the three-phase AC grid voltage is detected and at least the lower gate driver elements are deactivated, for example by their feed or supply voltage being turned off. In the case of an F3E, only the lower gate driver elements may be turned off, wherein the upper gate driver elements remain permanently active as soon as the AC grid voltage is present.

The invention enables inexpensive and reliable mains failure identification by evaluating the drive signals of the gate drivers that are already present. The gate drivers therefore perform a dual use. The gate drivers are used firstly, in a conventional manner, to drive the semiconductor switching devices and also, according to the invention, for mains failure identification, since the drive signals allow conclusions about the presence of the mains phases of the three-phase AC grid voltage. The invention therefore enables mains failure identification with only a few additional components. In particular, no additional sensors for acquiring the voltages of the mains phases, for example in the form of voltage sensors, are necessary for mains failure identification.

Other objects, advantages and novel features of the present invention will become apparent from the following detailed description of one or more preferred embodiments when considered in conjunction with the accompanying drawing.

BRIEF DESCRIPTION OF THE DRAWING

FIG. 2 shows a temporal profile of first drive signals that are generated by gate drivers of an active mains-fed rectifier of the frequency converter shown in FIG. 1.

DETAILED DESCRIPTION OF THE DRAWING

Figure 1:
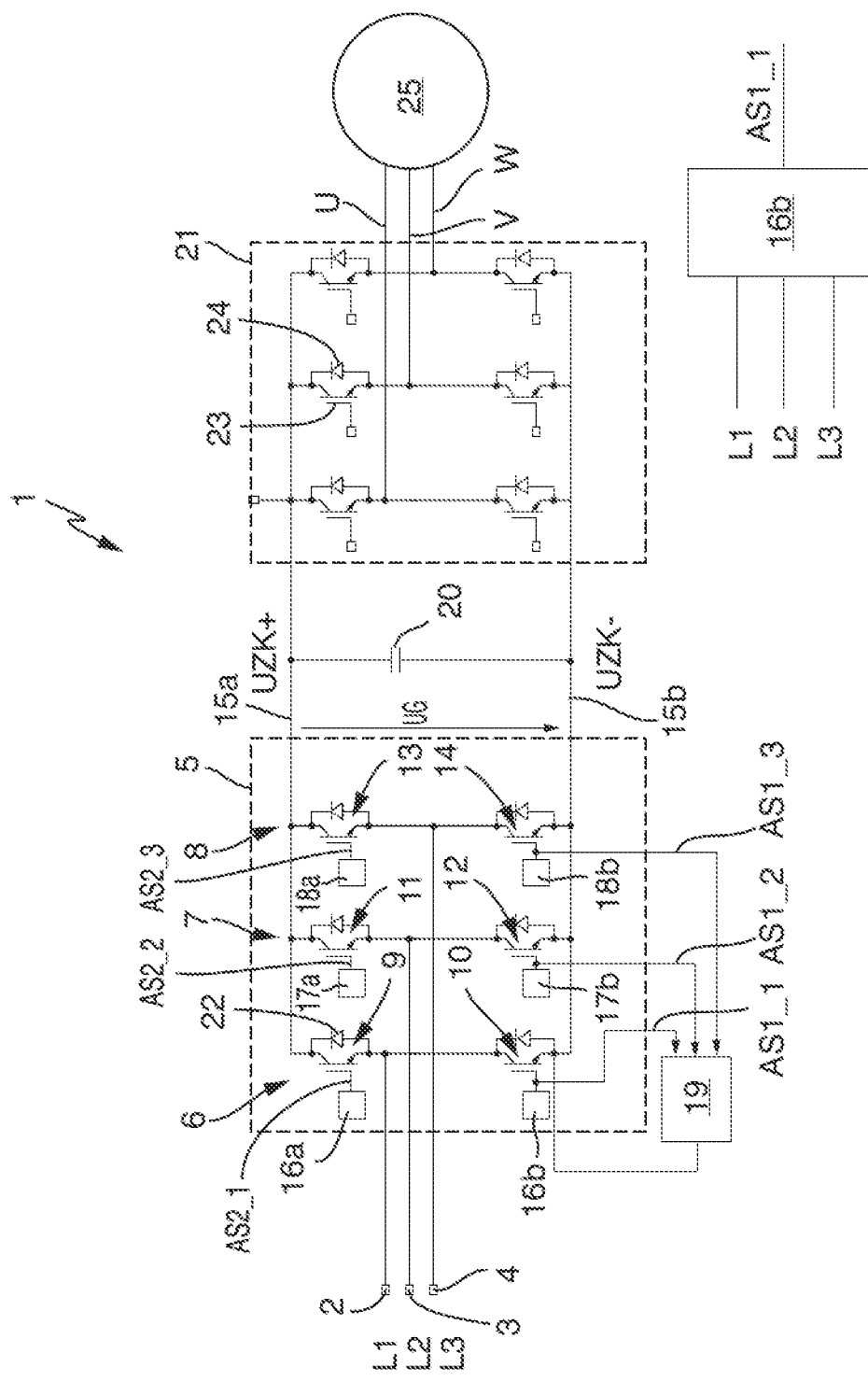
FIG. 1 is a schematic circuit diagram of a frequency converter having a fundamental frequency front-end and a mains phase failure identification function according to the invention.

FIG. 1 shows a circuit diagram of a frequency converter 1 having a first phase connection 2 for the connection of a first phase L1 of a three-phase AC grid voltage, a second phase connection 3 for the connection of a second phase L2 of the three-phase AC grid voltage, and a third phase connection 4 for the connection of a third phase L3 of the three-phase AC grid voltage.

The frequency converter 1 furthermore has a three-phase bidirectional power converter 5 that is electrically connected to the first phase connection 2, the second phase connection 3 and the third phase connection 4 and is in the form of a self-commutated or mains-fed active rectifier in a B6 topology, which is part of an F3E. The bidirectional power converter 5 is designed to generate a DC voltage UG from the three-phase AC grid voltage, wherein the bidirectional power converter 5 has three bridge branches 6, 7, 8.

A respective bridge branch 6; 7 or 8 has the following: a first semiconductor switching device 10; 12 or 14, in particular in the form of an insulated-gate bipolar transistor (IGBT), having a control input and a second semiconductor switching device 9; 11 or 13, in particular in the form of an insulated-gate bipolar transistor, having a control input, wherein the first semiconductor switching device 10; 12 or 14 and the second semiconductor switching device 9; 11 or 13 are connected in series between a first conductor 15a, which carries a positive intermediate circuit potential UZK+, and a second conductor 15b, which carries a negative intermediate circuit potential UZK−, and a connection node of the first semiconductor switching device 10; 12 or 14 and of the second semiconductor switching device 9; 11 or 13 is electrically connected to an associated phase connection 2; 3 or 4. Mains diodes 22 are conventionally connected in parallel with each of the semiconductor switching device 9 to 14.

A respective bridge branch 6; 7 or 8 furthermore has the following: a gate driver 16a, 16b; 17a, 17b or 18a or 18b that is designed to generate a first or lower drive signal AS1_1; AS1_2 or AS1_3 and a second or upper drive signal AS2_1; AS2_2 or AS2_3 based on a potential of the associated phase connection 2, 3 or 4. The control input of the first semiconductor switching device 10; 12 or 14 has the first drive signal AS1_1; AS1_2 or AS1_3 applied to it and the control input of the second semiconductor switching device 9; 11 or 13 has the second drive signal AS2_1; AS2_2 or AS2_3 applied to it. The gate drivers have lower gate driver elements 16b, 17b or 18b for generating the first or lower drive signals AS1_1, AS1_2 or AS1_3 and have upper gate driver elements 16a, 17a or 18a for generating the second or upper drive signal AS2_1, AS2_2 or AS2_3.

FIG. 2 then shows a temporal profile of the first drive signals AS1_1; AS1_2; AS1_3 at a frequency of the AC grid voltage of 50 Hz. As shown, the lower gate driver elements 16b, 17b or 18b generate the first drive signals AS1_1, AS1_2 or AS1_3 in the form of square-wave voltages with a respective frequency of 50 Hz and a pulse duration of around 7 ms, wherein the drive signals AS1_1, AS1_2 or AS1_3 are phase offset from one another in accordance with the phase difference of the associated mains phase L1, L2 or L3. Reference should also be made in this respect to the relevant technical literature.

The frequency converter 1 furthermore has a monitoring unit 19, for example in the form of an LC filter and a downstream microprocessor, which is designed to detect a failure of at least one mains phase L1, L2, L3 of the three-phase AC grid voltage. The monitoring unit 19 is supplied with the respective first drive signals AS1_1, AS1_2, AS1_3 and is designed to detect the failure of the at least one mains phase L1, L2, L3 of the three-phase AC grid voltage based on a temporal profile of the respective first drive signals AS1_1, AS1_2, AS1_3.

For this purpose, the monitoring unit 19 monitors a pulse duration of the respective first drive signals AS1_1, AS1_2, AS1_3 and/or a time difference between the pulses of the respective first drive signals AS1_1, AS1_2, AS1_3. The monitoring unit 19 is designed to detect the failure of the at least one mains phase L1, L2, L3 of the three-phase AC grid voltage when the pulse duration of the respective first drive signals AS1_1, AS1_2, AS1_3 and/or the time difference between the pulses of the respective first drive signals AS1_1, AS1_2, AS1_3 exceeds a predefined threshold value. The threshold value is predefined here on the basis of a frequency of the three-phase AC grid voltage. By way of example, the threshold value of the pulse duration may be 15 ms at a frequency of the AC grid voltage of 50 Hz and the threshold value of the time difference between the pulses may be 33 ms.

The frequency converter 1 furthermore has a conventional intermediate circuit capacitor 20 that buffer-stores the DC voltage UG.

The frequency converter 1 furthermore has a conventional inverter 21 in a B6 topology, which is conventionally designed to drive a three-phase AC motor 25. The inverter 21 has conventional semiconductor switching devices 23, for example in the form of insulated-gate bipolar transistors (IGBT), with respectively parallel-connected freewheeling diodes 24 in the illustrated circuitry, wherein the semiconductor switching devices 23 may be driven conventionally at a (PWM) switching frequency. The inverter 21 has conventional phase connections U, V and W. Reference should also be made in this respect to the relevant technical literature.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A frequency converter, comprising:
   a first phase connection for a connection of a first phase of a three-phase AC grid voltage, a second phase connection for a connection of a second phase of the three-phase AC grid voltage, and a third phase connection for a connection of a third phase of the three-phase AC grid voltage;
   a three-phase bidirectional power converter that is electrically connected to the first phase connection, the second phase connection and the third phase connection and that is designed to generate a DC voltage from the three-phase AC grid voltage, wherein the bidirectional power converter has three bridge branches, wherein a respective one of the three bridge branches comprises:
      a first semiconductor switching device having a control input and a second semiconductor switching device having a control input, wherein the first semiconductor switching device and the second semiconductor switching device are connected in series between a first conductor, which carries a positive intermediate circuit potential, and a second conductor, which carries a negative intermediate circuit potential, and a connection node of the first semiconductor switching device and of the second semiconductor switching device is electrically connected to an associated phase connection of the first, second or third phase connection; and
      a gate driver that is designed to generate a first drive signal and a second drive signal based on a potential of the associated phase connection of the phase connections, wherein the control input of the first semiconductor switching device has the first drive signal applied to it and the control input of the second semiconductor switching device has the second drive signal applied to it; and
   a monitoring unit that is designed to detect a failure of at least one mains phase of the three-phase AC grid voltage,
   wherein
      the monitoring unit has the respective first drive signals applied to it and is designed to detect the failure of the at least one mains phase of the three-phase AC grid voltage based on a temporal profile of the respective first drive signals.

2. The frequency converter according to claim 1, wherein the monitoring unit is designed to detect the failure of the at least one mains phase of the three-phase AC grid voltage based on a pulse duration of the respective first drive signals and/or based on a time difference between pulses of the respective first drive signals.

3. The frequency converter according to claim 2, wherein the monitoring unit is designed to detect the failure of the at least one mains phase of the three-phase AC grid voltage when the pulse duration of the respective first drive signals and/or the time difference between the pulses of the respective first drive signals exceeds a predefined threshold value.

4. The frequency converter according to claim 3, wherein the threshold value is predefined on a basis of a frequency of the three-phase AC grid voltage.

5. The frequency converter according to claim 1, wherein the bidirectional power converter is self-commutated.

6. The frequency converter according to claim 1, wherein the bidirectional power converter is a mains-fed rectifier.

7. The frequency converter according to claim 1, wherein the bidirectional power converter is a component of a fundamental frequency front-end.

* * * * *